United States Patent Office 3,250,149
Patented May 10, 1966

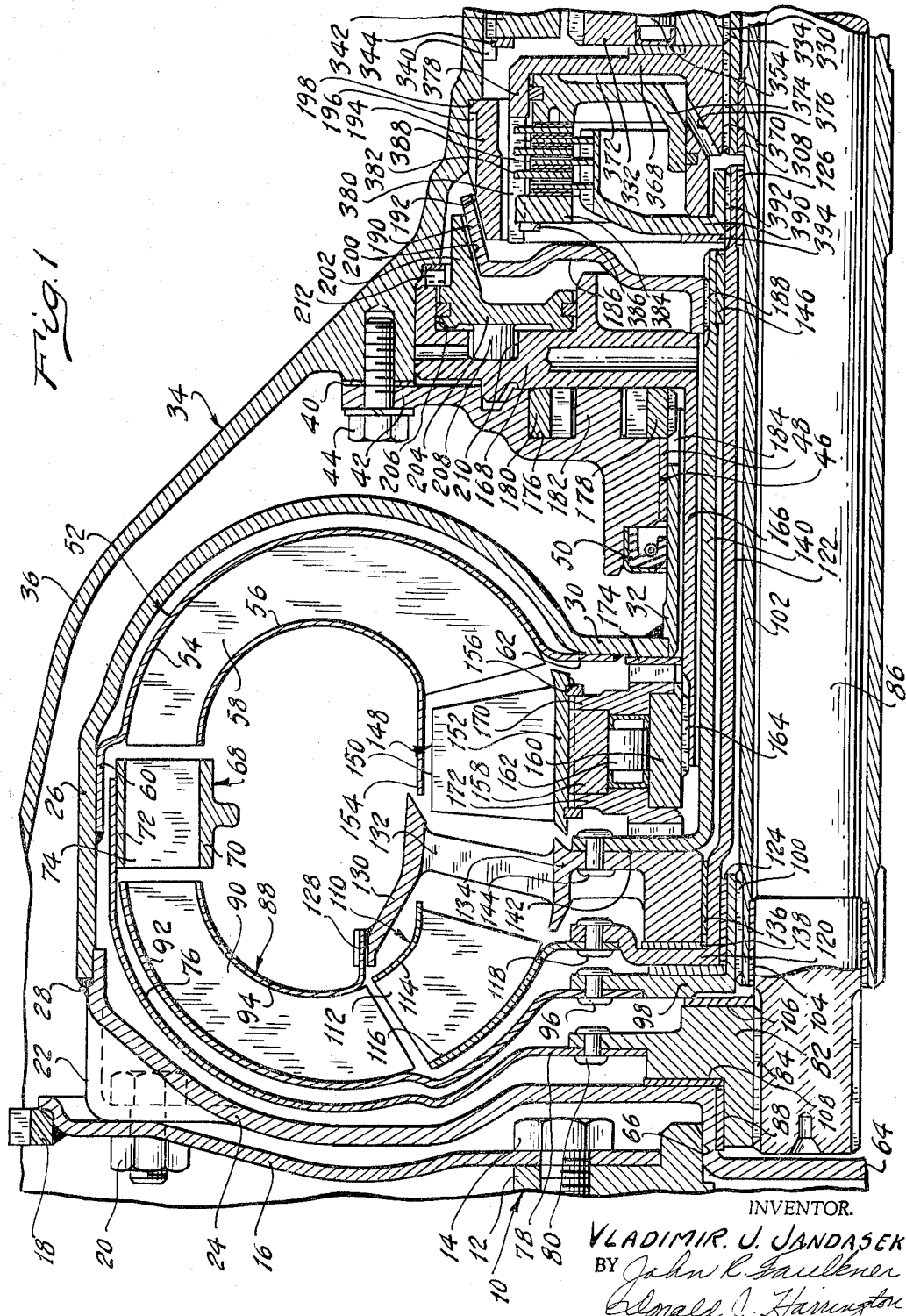

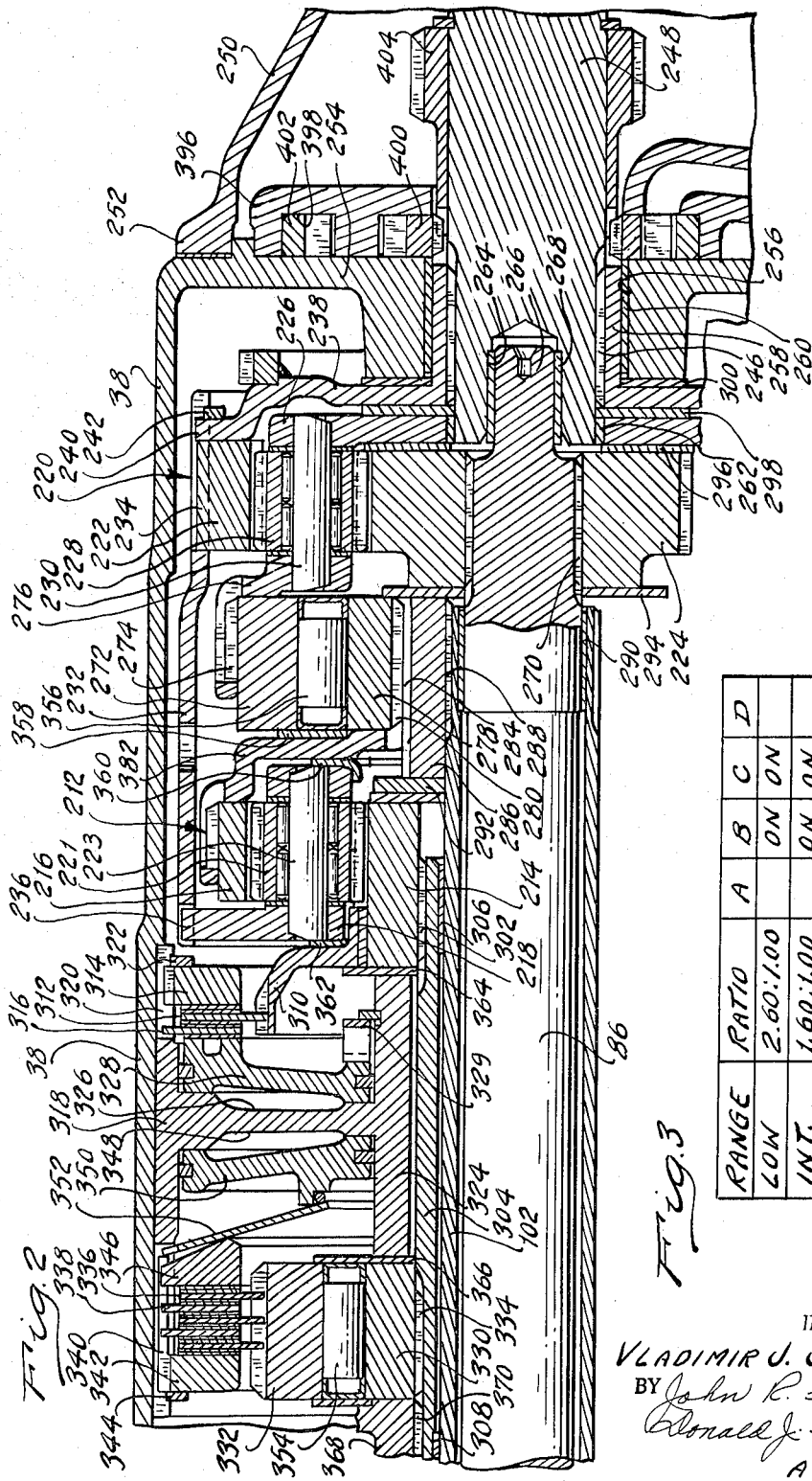

3,250,149
MULTIPLE TURBINE POWER TRANSMISSION MECHANISM
Vladimir Joseph Jandasek, Dearborn, Mich., assignor to Ford Motor Company, Dearborn, Mich., a corporation of Delaware
Filed July 18, 1963, Ser. No. 295,938
9 Claims. (Cl. 74—677)

My invention relates generally to hydrokinetic power transmission mechanisms, and more particularly to a power transmission mechanism having a multiple turbine hydrokinetic unit and two simple planetary gear units wherein the turbines of the hydrokinetic unit are arranged strategically with respect to the elements of the gear units to provide a continuous torque ratio variation. As power is distributed through the hydrokinetic and geared portions of the transmission mechanism to a drive member, the overall torque ratio is maintained at a relatively high value throughout the entire speed ratio range with each of the turbines of the hydrokinetic unit functioning during a separate stage of the speed ratio range to provide optimum performance.

I contemplate that my improved power transmission mechanism can be adapted for use in an automotive vehicle drive line for delivering power from a vehicle engine to the vehicle traction wheels. Unlike conventional automotive vehicle automatic transmission installations, my improved mechanism does not require timed engagement and release of friction torque establishing devices to establish speed ratio variations during the acceleration period. Each turbine member of the hydrokinetic unit is drivably coupled to a separate element of the gear units so that selective speed reduction ratios of the gear units can be accomplished as the turbine members of the hydrokinetic unit become effective for torque delivery.

The provision of a hydrokinetic power transmission mechanism of the type above set forth being a principal object of my invention, it is a further object of my invention to provide an improved clutch and brake system for such a mechanism for rendering the turbines sequentially operable for torque delivery, each turbine being adapted for peak performance at a separate speed ratio. As the turbines become operable for torque delivery, they each thereafter are capable of delivering a positive driving torque to a separate element of the gear units to provide a positive driving torque contribution following acceleration from a standing start.

I contemplate that the turbines will operate in this fashion during operation so that they each function to establish a separate torque delivery path through the gear units thereby providing a multiple power flow path from the driving member to the driven member, each path being comprised in part by a hydrokinetic portion and a wholly mechanical geared portion.

It is a further object of my invention to provide a power transmission mechanism of the type above set forth wherein the gear units are arranged strategically to provide a minimum transverse dimension for any given torque transmitting capacity. This characteristic is of importance in contemporary drive-line installations for automotive vehicles for which styling requirements impose a minimum space condition.

Further features and objects of my invention will become apparent from the following description and from the accompanying drawings wherein:

FIGURE 1 shows in cross sectional form the hydrokinetic portion of my improved power transmission mechanism, FIGURE 2 shows the principal geared portions of my power transmission mechanism, and FIGURE 3 is a chart showing the clutch and brake engagement and release pattern that is followed during operation in the various drive ranges.

Referring first to FIGURE 1, the numeral 10 designates generally a crankshaft for an internal combustion vehicle engine. It is provided with a flange 12 which may be bolted by means of bolts 14 to a drive plate 16. Secured to the periphery of the drive plate 16 is a vehicle engine starter ring gear 18.

Drive plate 16 is connected by means of bolts 20 to a shoulder 22 carried by an impeller shell part 24. A companion shell part 26 is welded at its outer periphery 28 to the outer periphery of the shell part 24. Impeller shell part 26 is formed in the shape of a torus and includes a hub portion 30 which is secured by welding to a support sleeve shaft 32.

The transmission housing is designated generally by reference character 34. It includes a bell housing portion 36 and a main housing portion 38. The two portions 36 and 38 are joined together to form a unitary cast housing assembly. At the juncture of the two portions there is a shoulder 40 to which is bolted a separator wall 42, suitable bolts 44 being provided for this purpose.

The shaft 32 extends through an opening 46 formed in the wall 42 and is journaled therein by means of a bushing 48. A suitable fluid seal 50 is situated between the wall 42 and the shaft 32 to isolate the interior of the housing portion 36 from the torus cavity of the hydrokinetic unit.

The hydrokinetic unit includes an impeller that is generally identified by reference character 52. It includes an outer shroud 54 and an inner shroud 56. Disposed in angularly spaced relationship about the axis of the hydrokinetic unit are impeller blades 58. The outer margins of the blades 58 are secured to the shroud 54 and the inner margins thereof are secured to the shroud 56. They cooperate with the shrouds to define radial outflow passages.

Shroud 54 is welded at its periphery 60 to the inner surface of the shell part 26. It is welded also at its inner periphery 62 to the hub 30 of the shell part 26.

Shell part 24 extends radially inwardly and is provided with a hub 64 that is received within a pilot opening 66 formed at the end of the crankshaft 10.

Situated at the flow exit region of the impeller blades 58 is a first turbine 68 which includes a first shroud 70, a second shroud 72 and first turbine blades 74. Blades 74 are situated in angularly spaced relationship about the axis of the hydrokinetic unit and function in the usual fashion to change the direction of the tangential fluid flow velocity vector for the fluid that traverses the torus circuit of the hydrokinetic unit. Turbine 68 decreases the moment of momentum of the fluid and creates thereby a positive driving torque.

The outer shroud 72 of the first turbine 68 is connected to a first turbine drive member 76 which extends radially inwardly. It is formed with a generally toroidal shape to conform with the shape of the shell part 24. Its inner periphery 78 is riveted, as shown at 80, to a hub 82. This hub is splined at 84 to a central turbine shaft 86 and journaled by bushing 88 within the shell part 24.

Situated at the flow exit region of the first turbine 68 is a second turbine 88. This turbine includes blades 90, an outer shroud 92 and an inner shroud 94. The blades 90 and the shrouds 92 and 94 cooperate to define radial inflow passages. The angularity of the blades 90 causes a change in the direction of the toroidal fluid flow to decrease the moment of momentum of the hydrokinetic fluid as the fluid traverses the passage of turbine 88. As will be explained subsequently, however, turbine 88 develops its maximum torque at a speed ratio that differs from the speed ratio at which the turbine 68 develops its maximum torque.

The outer shroud 92 extends inwardly and is riveted as shown at 96 to a second turbine hub 98. This hub is splined at 100 to a turbine sleeve shaft 102 which extends concentrically with respect to the central shaft 86. It is journaled upon shaft 86 by means of a bushing 104.

A thrust washer 106 is situated between hubs 86 and 98 to accommodate axial thrust. Another thrust washer 108 is situated between the shell part 24 and the hub 82.

A third turbine is identified generally by reference character 110. It includes third turbine blades 112, which are connected to an inner shroud 114, and an outer shroud 116. These blades 112 cooperate with the shrouds 114 and 116 to define fluid flow passages that form a continuation of the passages defined by the turbines 88 and 68.

The outer shroud 116 extends radially inwardly and is riveted at 118 to a third turbine hub 120. This hub in turn is connected to or is formed integrally with a third turbine sleeve shaft 122 which surrounds sleeve shaft 102. Shaft 122 is journaled upon hub 98 by means of a bushing 124. It is also journaled by means of a second bushing 126.

Inner shroud 88 is connected by means of a slot and dog connection 128 to a torque transfer member 130. This member includes a bladed web portion 132 which extends through the torus circuit at the flow exit region of the third turbine 110. It includes also a hub 134 which is journaled by means of a bushing 136 upon the shaft 122. A thrust washer 138 is situated between hub 120 and portion 134 to accommodate axial thrust.

Another sleeve shaft 140 surrounds sleeve shaft 122. It includes a radially extending flange portion 142 which is riveted at 144 to the portion 134. It is supported by means of a bushing 146 upon shaft 122.

A bladed stator is identified generally by reference character 148. It includes stator blades 150 and a stator shroud 152. Shroud 56 for the impeller 52 is formed with an extension 154 that encircles the blades 150 thereby providing a second shroud for the stator.

The stator blades function to change the direction of the torodial fluid flow in the hydrokinetic unit before it enters the entrance region of the blades 58 and thereby makes possible an augmentation of the effective turbine torque. The stator is subjected to a hydrokinetic torque reaction that acts in a direction opposite to the direction of rotation of the impeller in the normal fashion.

Shroud 152 is formed with an opening 156 which is internally splined to permit a splined connection with an externally splined overrunning brake race 158. An overrunning brake inner race is shown at 160, and disposed between the races 158 and 160 are overrunning brake elements in the form of rollers or sprags 162. If rollers are provided, race 158 can be cammed to permit a camming action with the elements 162. Stator 148 thus is inhibited from rotation in one direction, but freewheeling motion thereof in the opposite direction is permitted.

Race 160 is splined at 164 to a stationary stator shaft 166. This shaft is in the form of an extension on an adapter 168 which in turn is secured to the right hand side of the wall 42. It thus is held fast with respect to the housing 34.

A spacer element 170 is situated on the right hand side of the races 158 and 160, as viewed in FIGURE 1. A corresponding spacer element 172 is situated on the other side of the races. These spacer elements confine the overrunning brake elements 162.

A thrust washer 174 is disposed between the radially inward portion 30 of the shell part 26 and the spacer element 170. The spacer elements 170 and 172 and the race 158 are held axially fast by snap rings situated on either axial end of the opening 156 as indicated.

Wall 42 defines a pump chamber 176 and the adapter 168 covers it to define a pump cavity. Disposed within the chamber 176 are eccentric positive displacement pump gear elements 178 and 180 which are situated in mesh with each other. The crescent 182 is disposed in the space between the teeth of gears 178 and 180 in the normal fashion. Gear 178 functions as a driving element and is keyed at 184 to the shaft 32. The pump thereby is driven by the vehicle engine.

A brake element 186 is splined at 188 to the end of sleeve shaft 140. It carries on its outer periphery a cone brake element 190 which is formed with a friction surface situated directly adjacent the friction surface 192 carried by another cone brake element 194. This element 194 is keyed or splined at 196 to the interior of the housing portion 38. A reaction shoulder 198 acts against element 194 to accommodate axial thrust.

Another friction surface 200 is formed on an extension 202 of an annular piston 204. The piston 204 in turn is received within an annular cylinder 206. Cylinder 208 is defined by the adapter 168 and cooperates with the piston 204 to define an annular fluid pressure chamber. An extension 208 is formed on the piston 204 and is received within an opening 210 formed in the adapter 168.

A piston return spring 212 is disposed between piston 204 and a shoulder formed in the housing portion 38.

As fluid pressure is admitted to the working chamber behind piston 204, cone brake element 190 engages each of the adjacent friction surfaces thereby anchoring sleeve shaft 140. This holds the first turbine 88 stationary. Shaft 102, of course, then is held stationary also since it is connected directly to the turbine 88.

A first simple planetary gear unit is indicated generally by reference character 212. It includes a sun gear 214, a ring gear 216, a carrier 218 and planet pinions 221. These pinions are supported upon pinion shafts 223 which in turn are carried by the carrier 218. They mesh with the ring gear 216 and the sun gear 214.

A second planetary gear unit is indicated generally by reference character 220. It includes a ring gear 222, a sun gear 224, a carrier 226 and planet pinions 228. Pinions 228 are rotatably supported upon pinion shafts 230 which in turn are carried by the carrier 226. Pinions 228 mesh with the sun gear 224 and the ring gear 222.

A drive drum 232 is keyed or splined at 234 to the ring gear 222. It is connected by means of a slot and dog connection 236 to the carrier 218, thereby establishing a driving connection between carrier 218 and ring gear 222. Ring gear 222 in turn is connected to a drive disc 238 by means of a keyed or splined connection 240. Disc 238 is held axially fast with respect to the drum 232 by a snap ring 242. It is splined at 246 to a power output shaft 248. This shaft extends axially through a tailshaft extension housing 250 which may be bolted or otherwise secured at its periphery 252 to the housing portion 238.

An end wall 254 formed on the housing portion 38 is formed with a central opening 256 through which shaft 248 extends. The drive disc 238 has an extension 258 which is journaled within the opening 256 by means of a bushing 260.

Carrier 226 is supported upon a power output shaft 248 by a bushing 262. The power output shaft is formed also with an opening 264 which receives a reduced diameter portion 266 of the turbine shaft 86. Shaft 86 is rotatably supported with respect to shaft 248 by means of a bushing 268.

Sun gear 224 is splined at 270 to the shaft 86 so that the first turbine 68 is capable of delivering torque directly to the sun gear 224.

Carrier 226 is positively connected to an overrunning coupling or race 272 by means of drive teeth 274 formed on its outer periphery. These teeth are received within cooperating slotted openings formed in a torque transfer member 276 which is connected directly to carrier 226.

An inner overrunning coupling race, shown at 278, is splined or keyed at 280 to a torque transfer member 282 which in turn is drivably connected to ring gear 216 by means of a connection that is similar to the connection between overrunning coupling race 272 and member 276. The radially inward portion of member 282 is formed with an axial extension that is splined at 284 to a coupling hub 286. This hub in turn is internally splined at 288 to sleeve shaft 102 which is supported by a bushing 290 upon the shaft 86. A thrust washer 292 is situated between sun gear 214 and the hub 286. Another thrust washer 294 is situated between the other side of the hub 286 and the sun gear 224.

A thrust washer is provided also between sun gear 224 and the carrier 226 as shown at 296. In a similar fashion thrust washers 298 and 300 are situated on either side of the torque transfer disc 238 to accommodate axial thrust. Sun gear 214 is splined at 302 to an intermediate sleeve shaft 304 which is supported upon sleeve shaft 102 by means of spaced bushings 306 and 308.

Sun gear 214 is splined also to a friction brake element 310 which extends radially outwardly. It is splined at its periphery to accommodate a driving connection with an internally splined brake disc 312. This brake disc is situated between a brake reaction ring 314 and an externally splined brake disc 316. Ring 314 and disc 316 are carried by a brake drum 318 which is pinned or otherwise positively connected to the interior of the housing portion 38. The drum includes a first splined portion 320 to facilitate a splined connection with reaction ring 314 and brake disc 316. The ring 314 is held axially fast by means of a snap ring 322 carried by the drum 318.

Drum 318 includes an axially extended hub 324 which surrounds intermediate sleeve shaft 304. It defines an annular cylinder 326 within which is received an annular piston 328. The cylinder 326 and the piston 328 cooperate to define a fluid pressure chamber that may be pressurized through suitable internal passage structure not shown. When fluid pressure is admitted behind the piston 328, the radially outward portion of the piston 328 urges the friction discs 316 and 312 into frictional engagement thereby anchoring sun gear 214. A piston return spring 329 is situated between a snap ring carried by hub 324 and piston 328.

Another overrunning coupling inner race is shown at 330 and a cooperating outer race is shown at 332. Race 330 is splined at 334 to the sleeve shaft 304. Race 332 is externally splined to permit a driving connection with internally splined brake discs 336. These are received in interdigital relationship with respect to externally splined brake discs 338 which are connected in a fixed fashion to an externally splined portion 340 of the brake drum 318.

A reaction ring 342 is externally splined also to the portion 340 and held axially fast with respect to the drum 318 by a snap ring 344.

A pressure plate 346 is carried by the drum 318. It is adapted to move axially with respect thereto although rotary motion of the plate 346 with respect to the drum 318 is inhibited.

Drum 318 defines also a second annular cylinder 348 within which is situated an annular piston 350. Cylinder 348 and piston 350 cooperate to define an annular working chamber which may be pressurized by means of a suitable pressure feed passage, not shown. An intermediate portion of the piston 350 engages the inner periphery of a Belleville type brake actuator spring 352. The outer periphery of spring 352 is pivoted upon the drum 318 and its intermediate portion engages the pressure plate 346. Thus the pressure force applied to the piston 350 is magnified by the leverage provided by the spring 352 as it engages the multiple disc brake assembly.

Overrunning coupling elements 354 in the form of rollers or sprags are situated between the races 330 and 332 to permit one-way braking action between the races. Freewheeling motion of the race 330 with respect to the race 332 thereby is inhibited in one direction but is accommodated in the opposite direction. In a similar fashion, overrunning brake elements 356 are situated between races 278 and 272 for the previously described overrunning coupling structure. These also may be in the form of sprags or rollers and they establish a one-way braking action between the races but permit relative rotation therebetween in the opposite direction.

A thrust washer 358 is situated between race 272 and the torque transfer member 282, and another thrust washer 360 is situated between member 282 and the carrier 218. A thrust washer is provided also between carrier 218 and brake element 310, as shown at 362, and on either axial side of the extension 324 as indicated at 364 and 366 to accommodate axial thrust acting upon the sun gear 214 and the race 330.

A clutch drum 368 is splined at 370 to intermediate sleeve shaft 304. It defines an annular cylinder 372 within which is received an annular piston 374. Cylinder 372 and piston 374 cooperate to define a fluid pressure chamber that may be pressurized by means of a pressure feed passage 376 formed in the hub of the drum 368. Passage 376 in turn forms a portion of the automatic control valve system, not shown.

The periphery 378 of the drum 368 is slotted, as shown at 380, to effect a driving connection with externally splined clutch discs 382. A clutch reaction disc 384 also is splined to the periphery 378 and held axially fast with respect to the drum 368 by a snap ring 386.

Situated in interdigital relationship with respect to the discs 382 are internally splined clutch discs 388. These are carried by an internally splined clutch element 390. The hub of element 390 is splined at 392 to the sleeve shaft 122. A thrust washer 394 is situated between the end of shaft 140 and the clutch element 390.

As fluid pressure is admitted to the cylinder 372, piston 374 causes the clutch discs 388 and 382 to become frictionally engaged, thereby establishing a driving connection between shaft 122 and shaft 304.

A pump housing 396 is secured to the end wall 254 of the housing portion 38. It defines a pump chamber 398 within which are situated positive displacement pump gear elements 400 and 402. Gear element 400 is drivably connected to power output shaft 248 as indicated. If desired, a speedometer drive gear 404 can be connected drivably also to the power output shaft 248 within the housing extension 250.

The gear units 212 and 220 are capable of establishing three forward drive speed ratios and a single reverse ratio. A forward drive speed ratio change is accomplished automatically as the turbines become selectively operable. For the purpose of simplifying the description of the mode of operation, the cone brake is identified in FIGURE 3 by the symbol A. The multiple disc clutch assembly shown in part at 382 and 388 is identified by the symbol B. The multiple disc brake assembly shown in part at 338 and 336 is identified in FIGURE 3 by the symbol C. Finally, the multiple disc brake assembly shown in part at 316 and 312 is identified in FIGURE 3 by the symbol D.

During initial starting and throughout the forward drive ranges, clutch B and brake C are applied and brakes A and D are released. As the vehicle accelerates from a standing start, turbine torque is developed by the first turbine 68 and delivered through shaft 86 to the sun gear 224. This imparts a forward driving torque to the carrier 226 since the stationary tail shaft 248 acts to hold the ring gear 222 stationary until the vehicle is in motion. The torque of the carrier 226 then is distributed through overrunning coupling elements 356 to the ring gear 216 for the planetary gear unit 212. Sun gear 214 is inhibited from rotation in a backward direction relative to the direction of motion of the turbine 68 by the overrunning coupling elements 354.

The torque reaction of sun gear 214 thus is distributed through the engaged multiple disc brake assembly C to the housing 34. A forward driving torque then is transmitted to the carrier 218 and this carrier torque is distributed through the drum 232 to the power output shaft 248. Since the clutch assembly B is engaged, turbine 110 is held stationary. Clutch B locks the turbine 110 to the inner race 330.

Under these initial starting conditions, the torque of the turbine 68 exceeds the magnitude of the torque of the turbine 88, the latter rotating at a speed that is determined by the gear ratio of gear unit 220. Upon an increase in the speed ratio of the hydrokinetic unit, however, the magnitude of the torque of turbine 68 diminishes and the magnitude of the torque of turbine 88 increases. After the torque of the turbine 88 is sufficient to permit turbine 88 to function as a primary driving element, it will provide a primary driving effort for the ring gear 216. At this time the overrunning coupling shown in part at 356 will overrun. Ring gear 216 thus functions as the power input element for the gear system. The sun gear 214, however, still functions as a reaction element since it is anchored by the overrunning brake shown in part at 354. Carrier 218 then is driven at an increased speed ratio and its motion is transmitted to the power output shaft through the drive drum 232.

The turbine 110 continues to remain stationary during the intermediate stage of the acceleration period, and it functions to direct fluid flow to the inlet of the stator 148. For all practical purposes, it supplements the action of the stator to change the direction of the toroidal fluid flow to provide optimum flow entrance conditions for the impeller.

Upon a further increase in speed ratio, the torque acting upon the turbine 110 begins to increase relative to the torque of the turbine 88. At this time, turbine torque of the turbine 110 is distributed through shaft 122 and through the multiple disc clutch assembly B to the shaft 304 and hence to the sun gear 214. The turbine 88 continues to drive the ring gear 216. When the speed of the turbine 110 approaches the speed of the turbine 88, the sun gear 214 and the ring gear 216 are driven at speeds that are approximately equal. This establishes a substantially 1 to 1 gear ratio in the gear system and the mechanism then is conditioned for cruising operation with a split power delivery path through the hydrokinetic unit.

As the turbine 110 approaches the speed of the turbine 88, the overrunning coupling 354 overruns to establish a non-synchronous shift from one drive ratio to the other.

To establish reverse drive operation, the cone brake A is engaged and the other friction elements are disengaged. This anchors the turbine 88 and the sleeve shaft 102. It anchors also the ring gear 216 since it is connected to the shaft 102.

Turbine torque then is delivered from the first turbine 68 through turbine shaft 86 to the sun gear 214. The carrier 226 acts as a reaction member under these conditions since it is inhibited from rotation in a forward direction by the overrunning coupling shown in part at 356. The overrunning coupling race 278 of course is held stationary since it is connected to the ring gear 216 and the shaft 102. The ring gear 222 then is driven in a reverse direction, and this reverse motion is imparted to the power output shaft 248.

Multiple disc brake assembly D can be engaged to establish a coast braking condition. Sun gear 214 is capable therefore of acting as a reaction member since the overrunning coupling shown in part at 354 will be by-passed by the brake assembly D. The ring gear 216 is overspeeded with respect to the power output shaft 214 and its motion is transmitted to the turbine 88 to establish a hydrokinetic braking action in the hydrokinetic unit.

Neutral can be obtained by disengaging the multiple disc clutch assembly B and by releasing all of the other friction torque establishing devices.

Having thus described a preferred embodiment of my invention, what I claim and desire to secure by U.S. Letters Patent is:

1. A hydrokinetic power transmission mechanism comprising a hydrokinetic unit having an impeller and multiple turbines situated in toroidal fluid flow relationship in a common torus circuit, a pair of simple planetary gear units, each gear unit comprising a sun gear, a ring gear, a carrier and planet gears carried by said carrier in meshing engagement with said sun and ring gears, a first turbine of said hydrokinetic unit being connected to the sun gear of a first of said gear units, the ring gear of said first unit being connected to a driven member, coupling means for connecting the carrier of said first gear unit to the ring gear of the other gear unit, means for anchoring the sun gear of said other gear unit, the carrier of said other gear unit being connected to said driven member, a second turbine of said hydrokinetic unit being connected to the ring gear of said other gear unit and means for connecting a third turbine of said hydrokinetic unit to the sun gear of said other gear unit.

2. A hydrokinetic power transmission mechanism comprising a hydrokinetic unit having an impeller and multiple turbines situated in toroidal fluid flow relationship in a common torus circuit, a pair of simple planetary gear units, each gear unit comprising a sun gear, a ring gear, a carrier and planet gears carried by said carrier in meshing engagement with said sun and ring gears, a first turbine of said hydrokinetic unit being connected to the sun gear of a first of said gear units, the ring gear of said first unit being connected to a driven member, coupling means for connecting the carrier of said first gear unit to the ring gear of the other gear unit, means for anchoring the sun gear of said other gear unit, the carrier of said other gear unit being connected to said driven member, a second turbine of said hydrokinetic unit being connected to the ring gear of said other gear unit, means for connecting a third turbine of said hydrokinetic unit to the sun gear of said other gear unit, and reverse brake means for anchoring said second turbine and the carrier of said first gear unit, said reverse brake means and the coupling means for the carrier of said first gear unit including common portions.

3. A hydrokinetic power transmission mechanism capable of delivering torque from a driving member to a driven member, a hydrokinetic unit comprising an impeller and three turbines situated in fluid flow relationship in a common torus circuit, said impeller being connected to said driving member, a pair of simple planetary gear units, each gear unit comprising a sun gear, a ring gear, a carrier and planet gears rotatably journalled upon said carrier in meshing engagement with said sun and ring gears, a first turbine of said hydrokinetic unit being connected to the sun gear of a first of said gear units, the ring gear of said first gear unit being connected to said driven member, the carrier of said first gear unit being connected to an overrunning coupling race for a first overrunning coupling, a second overrunning coupling race for said first coupling being connected to the ring gear of a second of said gear units, a second overrunning coupling comprising first and second races, one race of said second overrunning coupling being connected to the sun gear of said second gear unit, selectively engagable friction brake means for anchoring the other race of said second overrunning coupling, the second turbine of said hydrokinetic unit being connected to the second race of said first overrunning coupling, the ring gear of said second gear unit being connected to said second race of said first overrunning coupling, the carrier of said second unit being connected to said driven member, and the third turbine of said hydrokinetic unit being connected to the sun gear of said second gear unit.

4. A hydrokinetic power transmission mechanism capable of delivering torque from a driving member to a driven member, a hydrokinetic unit comprising an impeller and three turbines situated in fluid flow relationship in a common torus circuit, said impeller being connected to said driving member, a pair of simple planetary gear units, each gear unit comprising a sun gear, a ring gear, a carrier and planet gears rotatably journalled upon said carrier in meshing engagement with said sun and ring gears, a first turbine of said hydrokinetic unit being connected to the sun gear of a first of said gear units, the ring gear of said first gear unit being connected to said driven member, the carrier of said first gear unit being connected to an overrunning coupling race for a first overrunning coupling, a second overrunning coupling race for said first coupling being connected to the ring gear of a second of said gear units, a second overrunning coupling comprising first and second races, one race of said second overrunning coupling being connected to the sun gear of said second gear unit, selectively engagable friction brake means for anchoring the other race of said second overrunning coupling, the second turbine of said hydrokinetic unit being connected to the second race of said first overrunning coupling, the ring gear of said second gear unit being connected to said second race of said first overrunning coupling, the carrier of said second unit being connected to said driven member, and the third turbine of said hydrokinetic unit being connected to the sun gear of said second gear unit, the connection between said third turbine and the sun gear of said second gear unit comprising a selectively engageable clutch.

5. A hydrokinetic power transmission mechanism capable of delivering torque from a driving member to a driven member, a hydrokinetic unit comprising an impeller and three turbines situated in fluid flow relationship in a common torus circuit, said impeller being connected to said driving member, a pair of simple planetary gear units, each gear unit comprising a sun gear, a ring gear, a carrier and planet gears rotatably journalled upon said carrier in meshing engagement with said sun and ring gears, a first turbine of said hydrokinetic unit being connected to the sun gear of a first of said gear units, the ring gear of said first gear unit being connected to said driven member, the carrier of said first gear unit being connected to an overrunning coupling race for a first overrunning coupling, a second overrunning coupling race for said first coupling being connected to the ring gear of a second of said gear units, a second overrunning coupling comprising first and second races, one race of said second overrunning coupling being connected to the sun gear of said second gear unit, selectively engagable friction brake means for anchoring the other race of said second overrunning coupling, the second turbine of said hydrokinetic unit being connected to the second race of said first overrunning coupling, the ring gear of said second gear unit being connected to said second race of said first overrunning coupling, the carrier of said second unit being connected to said driven member, the third turbine of said hydrokinetic unit being connected to the sun gear of said second gear unit, the connection between said third turbine and the sun gear of said second gear unit comprising a selectively engageable clutch, and reverse brake means for anchoring selectively said second turbine and the second race of said first overrunning coupling.

6. A hydrokinetic power transmission mechanism comprising a hydrokinetic unit having an impeller and multiple turbines situated in toroidal fluid flow relationship in a common torus circuit, a pair of simple planetary gear units, each gear unit comprising a sun gear, a ring gear, a carrier and planet gears carried by said carrier in meshing engagement with said sun and ring gears, a first turbine of said hydrokinetic unit being connected to the sun gear of a first of said gear units, the ring gear of said first unit being connected to a driven member, coupling means for connecting the carrier of said first gear unit to the ring gear of the other gear unit, means for anchoring the sun gear of said other gear unit, the carrier of said other gear unit being connected to said driven member, a second turbine of said hydrokinetic unit being connected to the ring gear of said other gear unit, means for connecting a third turbine of said hydrokinetic unit to the sun gear of said other gear unit, reverse brake means for anchoring said second turbine and the carrier of said first gear unit, and selectively engageable coast brake means for anchoring the sun gear of said second gear unit.

7. A hydrokinetic power transmission mechanism capable of delivering torque from a driving member to a driven member, a hydrokinetic unit comprising an impeller and three turbines situated in fluid flow relationship in a common torus circuit, said impeller being connected to said driving member, a pair of simple planetary gear units, each gear unit comprising a sun gear, a ring gear, a carrier and planet gears rotatably journalled upon said carrier in meshing engagement with said sun and ring gears, a first turbine of said hydrokinetic unit being connected to the sun gear of a first of said gear units, the ring gear of said first gear unit being connected to said driven member, the carrier of said first gear unit being connected to an overrunning coupling race for a first overrunning coupling, a second overrunning coupling race for said first coupling being connected to the ring gear of a second of said gear units, a second overrunning coupling comprising first and second races, one race of said second overrunning coupling being connected to the sun gear of said second gear unit, selectively engagable friction brake means for anchoring the other race of said second overrunning coupling, the second turbine of said hydrokinetic unit being connected to the second race of said first overrunning coupling, the ring gear of said second gear unit being connected to said second race of said first overrunning coupling, the carrier of said second unit being connected to said driven member, the third turbine of said hydrokinetic unit being connected to the sun gear of said second gear unit, and selectively engagable coast brake means for anchoring the sun gear of said second gear unit.

8. A hydrokinetic power transmission mechanism capable of delivering torque from a driving member to a driven member, a hydrokinetic unit comprising an impeller and three turbines situated in fluid flow relationship in a common torus circuit, said impeller being connected to said driving member, a pair of simple planetary gear units, each gear unit comprising a sun gear, a ring gear, a carrier and planet gears rotatably journalled upon said carrier in meshing engagement with said sun and ring gears, a first turbine of said hydrokinetic unit being connected to the sun gear of a first of said gear units, the ring gear of said first gear unit being connected to said driven member, the carrier of said first gear unit being connected to an overrunning coupling race for a first overrunning coupling, a second overrunning coupling race for said first coupling being connected to the ring gear of a second of said gear units, a second overrunning coupling comprising first and second races, one race of said second overrunning coupling being connected to the sun gear of said second gear unit, selectively engagable friction brake means for anchoring the other race of said second overrunning coupling, the second turbine of said hydrokinetic unit being connected to the second race of said first overrunning coupling, the ring gear of said second gear unit being connected to said second race of said first overrunning coupling, the carrier of said second unit being connected to said driven member, the third turbine of said hydrokinetic unit being connected to the sun gear of said second gear unit, the connection between said third turbine and the sun gear of said second gear unit comprising a selectively engageable clutch, and selectively engageable coast brake means for anchoring the sun gear of said second gear unit.

9. A hydrokinetic power transmission mechanism capable of delivering torque from a driving member to a driven member, a hydrokinetic unit comprising an impeller and three turbines situated in fluid flow relationship in a common torus circuit, said impeller being connected to said driving member, a pair of simple planetary gear units, each gear unit comprising a sun gear, a ring gear, a carrier and planet gears rotatably journalled upon said carrier in meshing engagement with said sun and ring gears, a first turbine of said hydrokinetic unit being connected to the sun gear of a first gear unit, the ring gear of said first gear unit being connected to said driven member, the carrier of said first gear unit being connected to an overrunning coupling race for a first overruning coupling, a second overrunning coupling race for said first coupling being connected to the ring gear of a second of said gear units, a second overrunning coupling comprising first and second races, one race of said second overrunning coupling being connected to the sun gear of said second gear unit, selectively engageable friction brake means for anchoring the other race of said second overrunning coupling, the second turbine of said hydrokinetic unit being connected to the second race of said first overrunning coupling, the ring gear of said second gear unit being connected to said second race of said first overrunning coupling, the carrier of said second unit being connected to said driven member, the third turbine of said hydrokinetic unit being connected to the sun gear of said second gear unit, the connection between said third turbine and the sun gear of said second gear unit comprising a selectively engageable clutch, reverse brake means for anchoring selectively said second turbine and the second race of said first overrunning coupling, and selectively engagable coast brake means for anchoring the sun gear of said second gear unit.

References Cited by the Examiner
UNITED STATES PATENTS 3,063,308  11/1962  Wayman _____ 74—677

DAVID J. WILLIAMOWSKY, *Primary Examiner.*

JOHN R. BENEFIEL, *Examiner.*